Dec. 15, 1931.  LE ROY B. MONOSMITH  1,836,543
METAL WORKING TOOL
Filed May 3, 1930
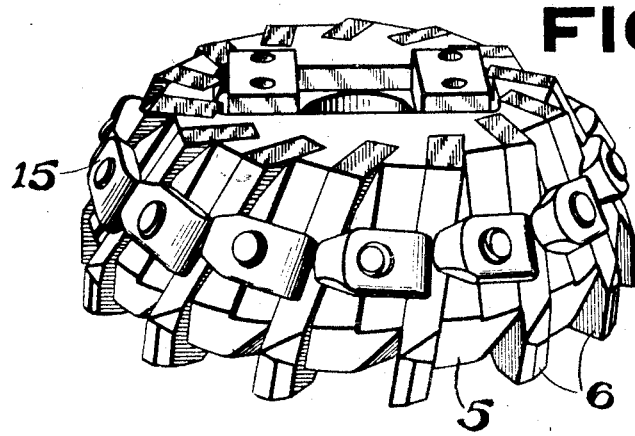
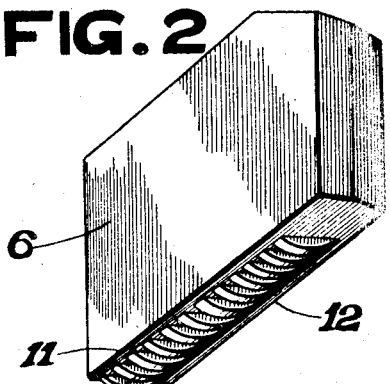
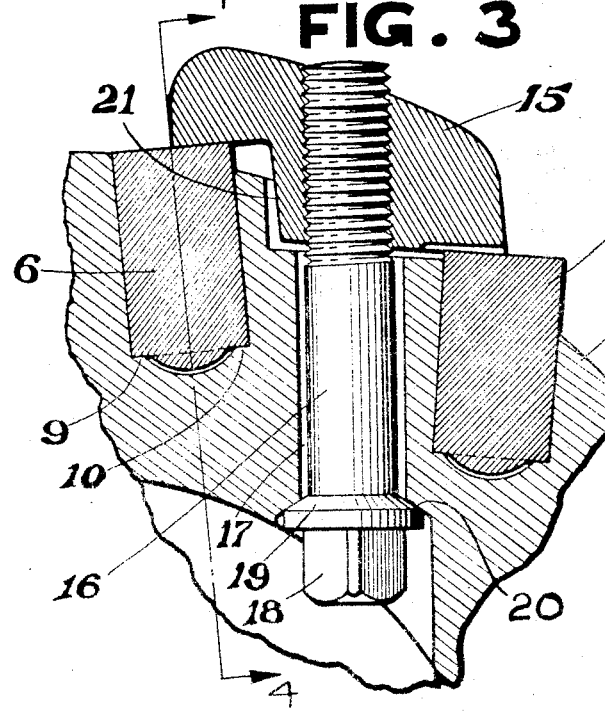
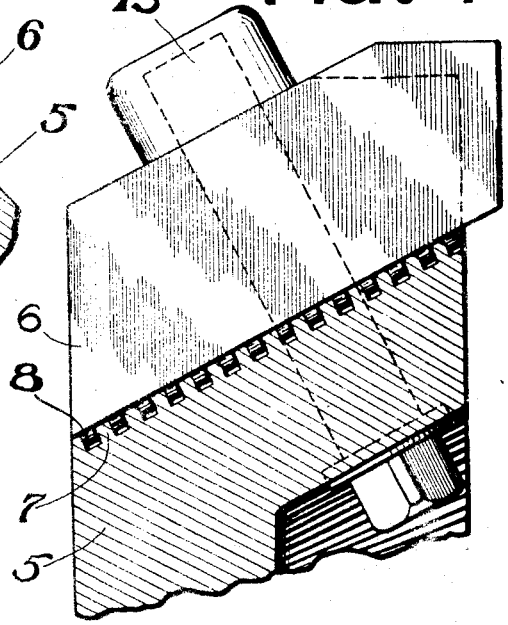
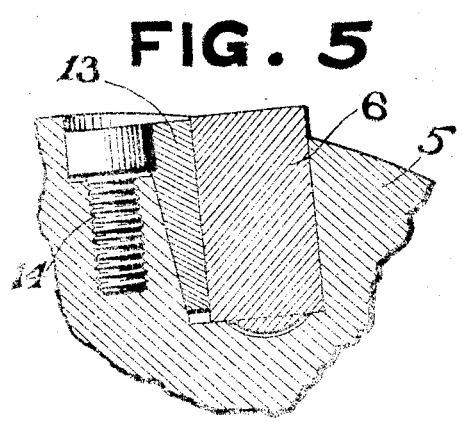
INVENTOR
LeRoy B. Monosmith
BY
ATTORNEY Patented Dec. 15, 1931

1,836,543

UNITED STATES PATENT OFFICE

LE ROY B. MONOSMITH, OF ROCKFORD, ILLINOIS, ASSIGNOR TO THE INGERSOLL MILLING MACHINE COMPANY, OF ROCKFORD, ILLINOIS, A CORPORATION OF ILLINOIS

METAL WORKING TOOL

Application filed May 3, 1930. Serial No. 449,422.

The present invention relates in general to metal working tools and has particular reference to that type of tool in which one or more inserted cutter teeth are rigidly and detachably secured in a rotary head, bar or the like mounting.

The application of the invention in the present instance is shown in connection with a milling cutter of the "face mill" type. Frequently these cutters are referred to in trade as "cone head" cutters due to the frustum shape of the head. In cutters of this type the cutting edges of the teeth are presented transversely to the axis of rotation of the head in which the cutters are mounted. This means considerable end thrust is imposed on the teeth and as a result special provision must be made to rigidly hold the teeth against movement in the direction of the thrust.

One difficulty in seeking a practical solution of the difficulties involved in the production of these types of cutters is concerned primarily in holding the teeth in an open-ended slot and at the same time allowing for adjustment of the teeth in a direction parallel with the axis of the head. Many solutions have been suggested such as interlocking the teeth in the head slots by the use of serrations, sometimes formed in the walls of the head slots and in the teeth themselves. In other instances, the use of shoes, keys and the like accessories have been employed. The use of such accessories is not to be tolerated if it is at all possible to get along without them because they add to the cost of production and are theorically wrong. One of the important objects of the present invention is to provide means such as serrations or the like for interlocking the teeth in the slots of the head and to place these serrations in the base of the slot where they are most needed, without the aid of such accessories as shoes, keys or the like.

Briefly, the salient feature of the invention resides in providing serrations in the base of a tooth slot in a milling cutter or the like head with the serrations extending at an angle to the longitudinal axis of the slot and to equip the cutter tooth with serrations on its underside to interlock with the serrations thus provided for in the base of the slot.

It is not uncommon to cut serrations in the base of a slot in a milling cutter head when the serrations extend longitudinally or parallel with the axis of the head but to produce these serrations crosswise in the slot is entirely a different matter. It is only after exercising considerable inventive ingenuity that it has been possible to devise a method of producing the serrations in the base of the slot crosswise to the axis of the head. The method of reducing the invention to practice is also a salient feature of the invention and one of its important objects.

While the foregoing statement is indicative in a general way of the nature of the invention other objects and advantages will be apparent upon a full understanding of the construction and co-operative relationship of the several parts of the tool.

Two forms of the invention are presented herein by way of exemplification but it will of course be understood that the invention is susceptible of embodiment in still other structural modified forms without departing from the spirit of the invention as defined in the sub-joined claims.

In the accompanying drawings:

Fig. 1 is a perspective view of an inserted tooth milling cutter embodying the invention;

Fig. 2 is a detailed view in perspective of a portion of a milling cutter embodying the invention;

Fig. 3 is a detailed view in section of a portion of a milling cutter assembly illustrating the application of the invention;

Fig. 4 is a section taken on the line 4—4, Fig. 3; and

Fig. 5 is a detailed view in section of a modified form of the invention.

Referring now to the drawings in detail, the part 5 represents a body portion or other mounting and for convenience will be referred to as a head. The head 5 is slotted at spaced intervals around the periphery thereof for the reception of the cutter teeth 6. As shown to best advantage in Fig. 1 the slots for the teeth 6 are open at both ends and the top.

In this type of tool the cutting edges of the teeth are on the ends thereof substantially transverse to the axis of the head. It therefore follows that the thrust on the teeth during a cutting operation is in a direction substantially parallel to the axis of the head. It is of course understood in the type of cutter which has been selected for illustration that the head is approximately cone-shape so that the teeth are mounted with a rake or in other words at an obtuse angle to the axis of the head.

To rigidly and releasably hold the teeth in the slots and to avoid any possible movement of the teeth due to end thrust the teeth are interlocked in the slots and they are also either clamped or wedged in place. To effect this interlocking engagement the base of the slots are serrated as at 7 and mating serrations 8 are provided on the underside of the teeth. The serrations 7 in the base of the slots are preferably formed as a result of a milling operation. The tool used being such as to produce a serrated median groove in the base of the slot which will leave shoulders or flat surfaces 9 and 10 on opposite sides of the serrations. In producing the companion serrations 8 on the underside of the teeth a similar tool is used but a form cutter is first used to leave a rib on the underside of the tooth and the rib is then serrated and this will leave flat surfaces 11 and 12 on opposite sides of the serrations 8 corresponding to the flat surfaces 9 and 10 in the base of the slot. The serrations 8 on the teeth are not deep enough to extend to the root of the serrations 7 and as a result the surfaces 11 and 12 on the teeth have a complete bearing on the shoulders 9 and 10 which of course is quite desirable as its adds to the rigidity of the assembly. To hold the teeth in the slots a wedge 13 may be employed for each tooth with a set screw 14 holding the wedge against displacement or else the clamping blocks 15 may be used. These members are made with a tapped hole into which is threaded a bolt 16. The bolt is inserted through an opening 17 in the body or head 5 and the bolt is made with a head 18 to accommodate a wrench and also a flange 19 which seats against the bevel seat 20. Each of the clamps 15 straddle two teeth and in this way each tooth has the benefit of two clamps.

The periphery of the head 5 is notched out as at 21 to accommodate the increased thickness of the clamps which is necessary to make it conform to the curvature of the body and to produce the required pressure on two teeth at the same time. From the above it will be seen that the present invention contemplates a practical method of producing serrations in the base of a milling cutter tooth slot with the serrations extending at an angle to the longitudinal axis of the slot which is quite an improvement over the use of inserted keys and shoes which have always been required to realize cross serrations.

Aside from the rigid interlock which the serrations provide the adjustability of the assembly is an important feature as it allows the teeth to be advanced to compensate for grinding wear.

Having thus described and shown an embodiment of this invention, what I claim and desire to secure by Letters Patent of the United States is:

1. In an inserted tooth metal working tool, the combination of a slotted head, serrations formed in the base of the slot in said head, said serrations extending at an angle to the longitudinal axis of the slot and terminating short of the side walls of the slot to leave flat bearing surfaces on opposite sides of the serrations, a cutter tooth for said slot, a serrated rib on the under side of said tooth to interlock with the serrations in the bottom of said slot, flat bearing surfaces on opposite sides of said serrated rib adapted to contact with the flat surfaces in the base of the slot, and means for holding the tooth in said slot.

2. In a metal working tool, a head having a peripheral slot therein, a serrated median groove in the base of said slot, a tooth in said slot, a serrated rib on the bottom of said tooth, the crests of the serrations on the bottom of the tooth terminating short of the root of the serrations in the slot and means for holding the tooth rigidly and detachably in said slot.

3. In a metal working tool, a head having a peripheral slot therein, a serrated median groove in the base of said slot, flat bearing surfaces on opposite sides of said groove, a tooth in said slot, a serrated rib on the bottom of said tooth, flat bearing surfaces on opposite sides of said rib, the crest of the serrations in said rib terminating short of the root of the serrations in said slot and means for holding the tooth rigidly and detachably in said slot.

4. In a metal working tool, a head having a peripheral slot therein, a serrated median groove in the base of said slot, flat bearing surfaces on opposite sides of said groove, a tooth in said slot, a serrated rib on the bottom of said tooth, flat bearing surfaces on opposite sides of said rib, the crest of the serrations in said rib terminating short of the root of the serrations in said slot; whereby the flat bearing surfaces on opposite sides of said groove, and clamping heads carried by the head and engaging tooth for holding the tooth rigidly and detachably in said slot.

Signed at Rockford, in the County of Winnebago, and State of Illinois, this 29th day of April, 1930.

LE ROY B. MONOSMITH.